United States Patent [19]

Lodin

[11] Patent Number: 4,852,925

[45] Date of Patent: Aug. 1, 1989

[54] LAMP REPLACEMENT TOOL

[75] Inventor: David W. Lodin, Peoria, Ariz.

[73] Assignee: Honeywell Inc., Minneapolis, Minn.

[21] Appl. No.: 209,711

[22] Filed: Jun. 22, 1988

[51] Int. Cl.[4] ............................ B25B 9/02; B25J 1/02

[52] U.S. Cl. ............................ 294/2; 7/107; 29/758; 29/764; 81/53.11; 294/24; 294/99.2

[58] Field of Search ........................ 294/2, 3, 16, 19.1, 294/24, 33, 99.1, 99.2, 100, 103; 7/107, 108, 165; 29/729, 747, 750, 756, 758, 764; 81/3.09, 3.8, 13, 44, 53.11

[56] References Cited

U.S. PATENT DOCUMENTS

| | | | |
|---|---|---|---|
| 251,182 | 12/1881 | Bullock | 294/99.2 X |
| 1,023,077 | 4/1912 | Grout | 294/2 X |
| 1,244,475 | 10/1917 | Currier | 294/99.1 X |
| 1,641,252 | 9/1927 | Dickey | 81/13 X |
| 2,184,074 | 12/1939 | Gent | 294/99.2 X |
| 2,608,433 | 8/1952 | Marbeuf | 294/99.2 |
| 2,802,211 | 8/1957 | Friedman | 294/99.2 X |
| 3,214,210 | 10/1965 | Keirn | 294/99.2 X |

FOREIGN PATENT DOCUMENTS

| | | | |
|---|---|---|---|
| 1545150 | 5/1979 | United Kingdom | 294/99.2 |

*Primary Examiner*—Johnny D. Cherry

*Attorney, Agent, or Firm*—Joseph S. Failla; Roger Jensen; Albin Medved

[57] ABSTRACT

A lamp replacement tool which provides for positively captivating lamps for ease of removing or inserting lamps from or into the type of a lamp housing that forms part of a flush mounted push button switch used in aircraft cockpit control panels. The lamp is mounted behind a display legend formed on the face of the push button and for lamp replacement the push button portion of the switch unplugs from the switch body and hinges down to expose the rear of the lamp. A friction fit maintains the lamp in the lamp housing. The lamp replacement tool includes upper and lower blades extending from a handle member in spaced apart parallel relationship. The lower blade is formed with a forked end portion having a u-shape for engaging with a flange formed on a base portion of the lamp and for embracing the base portion. The upper blade is formed with either a v-shaped portion or an aperture for engaging with a base contact protruding from one end of the lamp. The upper blade terminates in an angled lead-in. The lead-in provides a smooth surface for sliding over the base contact as the upper blade flexes over the base contact when the tool is pushed into engagement with the lamp. The lamp is locked or captivated between the upper and lower blades of the tool when the u-shaped end of the lower blade embraces the base portion and engages with the flange and the interior surfaces of the v-shape or aperture portion of the upper blade engage the periphery of the base contact.

17 Claims, 2 Drawing Sheets

LAMP REPLACEMENT TOOL

BACKGROUND

This invention relates to a lamp replacement tool and more particularly to a lamp replacement tool useful in replacing miniature lamps used in aircraft cockpit control panels.

Some aircraft cockpit control panels are designed with lighted push button switches having the push buttons mounted flush with the front of the control panel so as to avoid inadvertent switch actuations. Switches of this type are, typically, provided with the push button including a display having a legend indicative of the control function of the switch. Some display type switches are available which include legends visible in direct sunlight upon depression of the push button and invisible before push button depression. The push button portion of the switch includes the lamp housing which unplugs from the switch body and hinges down to expose the lamp for replacement. A friction fit maintains the lamp in the lamp housing. A typical switch of the type described is the Mark 15 P/N 10732 provided by Jay-El Products Inc., 1859 West 169th Street, Gardena, Calif. and a typical miniature lamp is the American National Standards Institute lamp number 6839 available from Oak Switch Systems Inc., P.O. Box 517, Crystal Lake, Ill.

The type of switch described above was designed with the intention that the lamp replacement could be accomplished manually without tools. However, experience has shown that due to the miniature size of the lamps and the tight quarters in the aircraft cockpit environment/difficulties were encountered in manually extracting the lamp from the lamp housing. Because of these tight quarters, problems have been encountered which include the dropping of lamps with the result of time lost in attempting to recover the dropped lamps. A more serious problem occurs when the lamp is dropped into the interior of the switch sometimes requiring the removal of the control panel in order to retrieve the lamp from the switch interior.

To overcome the forgoing problems attempts have been made to replace lamps using readily available tools such as various styles of screw drivers in conjunction with fingers or pliers or tweezers to extract the lamp from the housing. However, such attempts have met with erratic success and the foregoing problems continue to exist.

SUMMARY

The present invention encompasses a lamp replacement tool for use in replacing lamps from or into a lamp housing. The lamp is of the type which includes a bulb portion through which light is emitted, a base portion having one end adjacent the bulb portion, and a base contact protruding from another end of the base portion. The lamp base portion is provided with a circular flange formed on the base portion intermediate of the ends of the base portion.

The lamp replacement tool includes a handle member and upper and lower blades extending in the same direction from one end of the handle member in parallel relationship to each other. The lower blade is formed with forked end portion having a u-shape dimensioned so as to embrace the lamp base portion and engage the flange. The upper blade is formed with a v-shaped portion wherein the v-shape is inverted relative to the lower blade and the apex of the v-shape is aligned over the center of the radius of the u-shaped end of the lower blade. The v-shaped portion of the upper blade is dimensioned so as to have the interior surfaces of the v-shape contact the peripheral surfaces of the lamp base contact. The lamp is held between the forked and v-shaped portions thereby captivating the lamp securely between the upper and lower blades.

Further advantages and details of my invention can be had from the following description and claims taken together with the accompanying drawing.

DETAILED DESCRIPTION

Figure 1A:
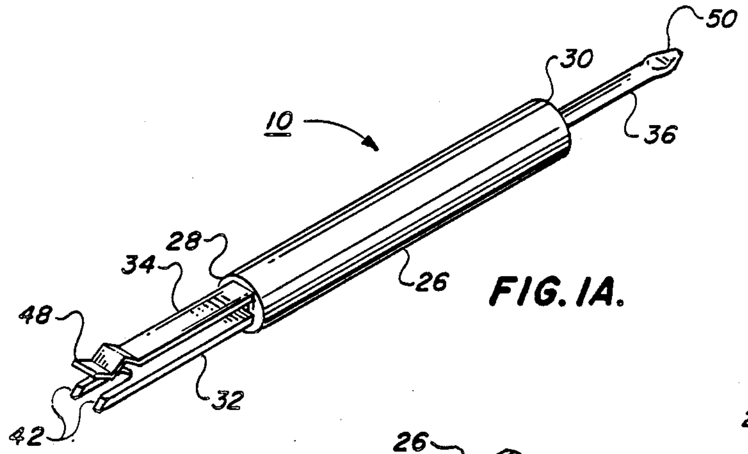
FIG. 1A is a perspective view of the lamp replacement tool of the present invention.
Figure 4:
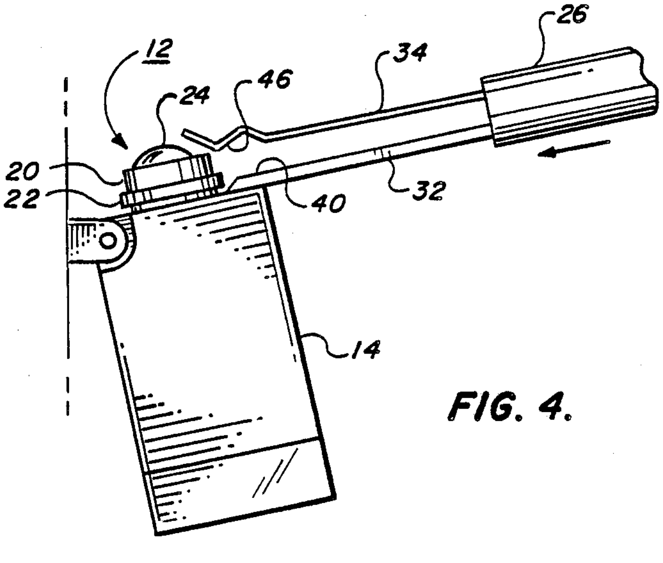
FIG. 4 is a side view of the lamp housing and a partial side view of the lamp replacement tool of the present invention in use.
Figure 5:
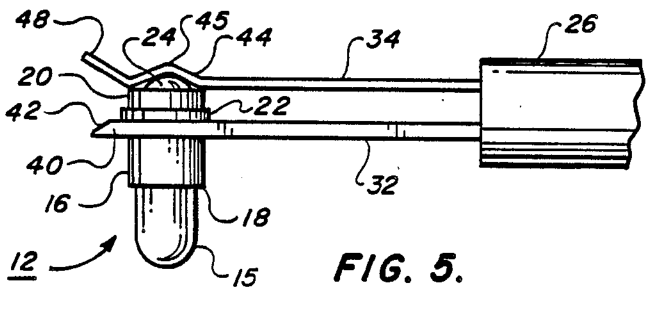
FIG. 5 is a partial side view of the lamp replacement tool with the lamp captivated between the upper and lower blades.

Referring now to the drawing, a lamp replacement tool 10, FIG. 1A, is shown for use in removing or inserting a lamp 12 FIG. 5, from or into a lamp housing 14, FIG. 4. The lamp 12, FIG. 5, includes a bulb portion 15, a base portion 16, having ends 18, 20, and a flange portion 22 at a location intermediate of ends 18, 20. End 20 includes a base contact 24 protruding therefrom and spaced from flange 22.

The lamp replacement tool 10, FIG. 1A, includes an elongated handle member 26 having ends 28, 30, a lower blade 32 and an upper blade 34 extending from end 28 and a pry-blade 36 extending from end 30.

The handle member 26, FIG. 1A, is shown as a generally cylindrically-shaped member preferably made of injected molded ABS thermoplastic, a common thermoplastic used in the injection molding process. However, other convenient shapes, materials, or methods of manufacture can be utilized in making handle member 26, such as, for example, wood or metal.

In the present embodiment of the invention both lower blade 32 and upper blade 34 are constructed of flat full hard 301 stainless steel sheet metal approximately 0.250 wide with the lower blade 32 having a thickness of 0.016 inches and upper blade 34 having a thickness of 0.010 inches selected to provide flexibility.

Figure 1C:
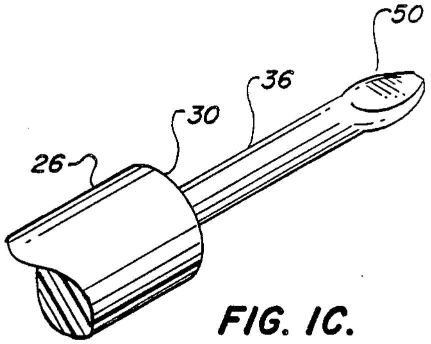
FIG. 1C is a partial perspective view of the lamp replacement tool of the present invention showing the pry-blade.
Figure 1B:
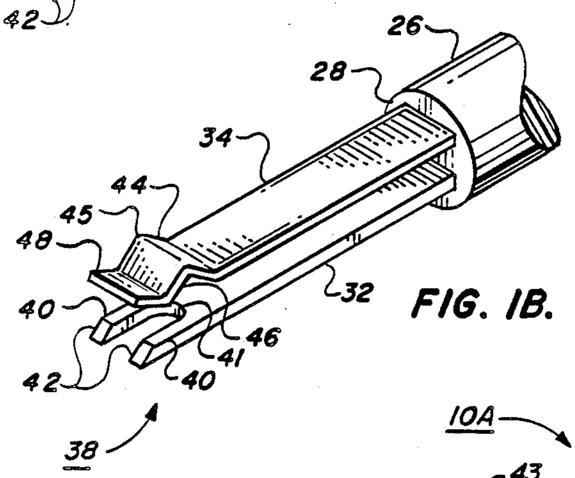
FIG. 1B is a partial perspective view of the lamp replacement tool of the present invention showing the upper and lower blades.

The lower blade 32, FIG. 1B, extends from end 28 of handle member 26 includes a means for engaging base portion 16, FIG. 5, and flange 22 comprising a u-shaped or forked end portion 38, FIG. 18 having a pair of legs 40 formed with chamfered ends 42 useful for initiating the lifting of lamp 12 from housing 14. The forked end portion 38 is in the form of a u-shape 41 dimensioned so as to embrace the lamp base portion 16 and engage with the base portion flange 22.

The upper blade 34, FIG. 1B, extends from end 28 of handle member 26 in spaced apart parallel relationship to lower blade 32. Upper blade 34 includes a v-shaped portion 44 with the apex 45 of the "V" formed transverse to the width axis of the upper blade 34. The interior surfaces 46 of the "V" shape face the lower blade 32. The apex 45 is aligned in the longitudinal direction with the center of radius of u-shaped portion 41. The upper blade 34 terminates with an angled lead-in 48 extending from the outward-most leg of the V-shaped portion 44.

The pry-blade 36, FIG. 1C, extends from end 30 of handle member 26 and in the present embodiment of the invention is constructed from 0.125 inch diameter 304 stainless steel rod. The distal end 50 of pry-blade 36 is wedge-shaped and resembles the shape of a flattened screw driver blade.

Figure 2:
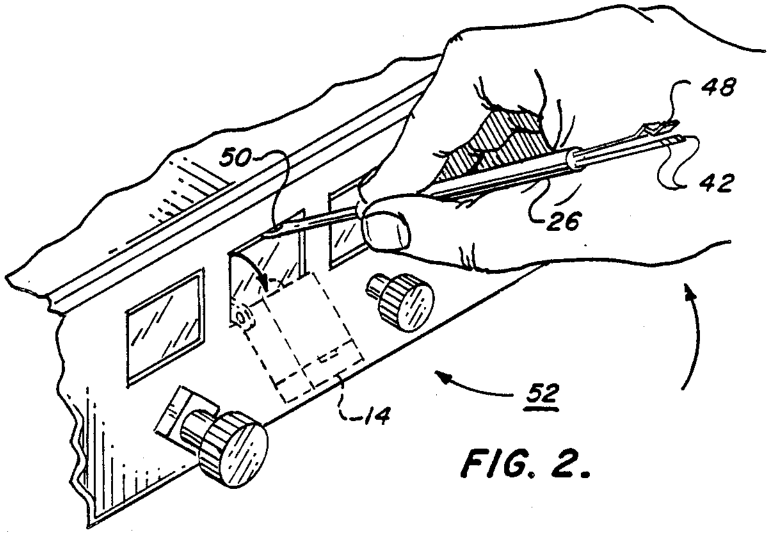
FIG. 2 is a perspective view of a portion of a typical cockpit control panel showing the pry-blade in use.
Figure 3:
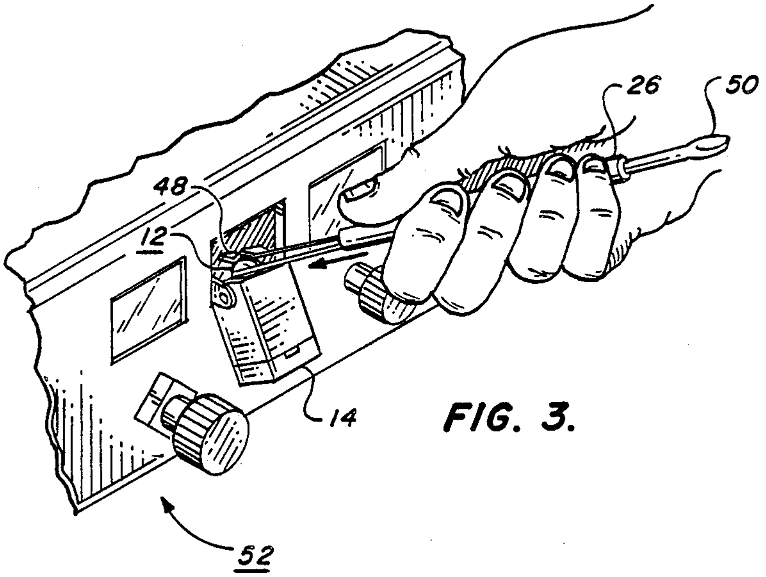
FIG. 3 is a perspective view of a portion of a typical cockpit control panel showing the lamp replacement tool in use.

In use of the lamp replacement tool 10 the pry-blade 36 is used to unplug the housing 14 from a switch body (not shown) located in switch panel 52 and to pivot the lamp housing 14, FIG. 2, from the switch panel 52 by prying lamp housing 14 into the pivoted open position shown in FIGS. 3, 4. With the lamp housing 14 in the open position, one of the chamfered tips 42 of lower blade 32 is inserted between the flange 22 and housing 14 and the tool 10 is rotated approximately ninety (90) degrees so as to engage the other chamfered tip 42 between the flange 22 and lamp housing 14. Now enough clearance is provided to slide the forked portion 38 under the flange 22 while pushing the tool 10 forward in the direction of the lamp 12 until the arcuate surface 41 contacts and embraces the base portion 16 of lamp 12.

As the tool 10 is pushed onto the lamp 12 the lower blade 32 supports the lamp 12 while the lead-in 48 provides a smooth surface for the upper blade 34 to slide and flex up and over base contact 24. As the lead-in 48 slides up and over base contact 24 the interior surfaces 46 of v-shaped portion 44 engage with the peripheral surfaces of base contact 24. The lamp 12 is now held between the v-shaped and forked portions 44 and 38 of the upper and lower blades 34 and 32, thereby locking and captivating the lamp 12 between the upper and lower blades 34 and 32 respectively. The captivated lamp 12 can now be safely removed from housing 14 by lifting the tool 10 away from the lamp housing 14.

To install a replacement lamp 12, the replacement lamp 12 can be grasped between the thumb and forefinger of one hand while the tool 10 is pushed onto the lamp 12 with the other hand as described above. Once the lamp 12 is captivated between the upper and lower blades 34 and 32 as previously described the lamp 12 can be inserted in the lamp housing 14 and the tool 10 can now be withdrawn.

Figure 1D:
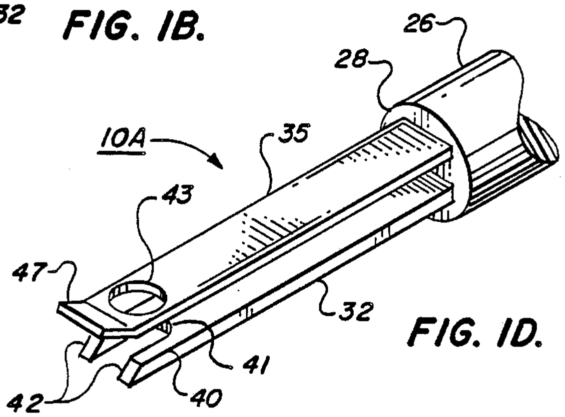
FIG. 1D is a partial perspective view of an alternate lamp replacement tool showing a modified upper blade.

An alternate construction of the tool 10 is shown as a tool 10A in FIG. 1D. In this construction an upper blade 35 includes an aperture 43 the center of which coincides with the center-of-radius of u-shaped portion 41 in lower blade 32, FIG. 1D. The diameter of aperture 43, FIG. 1D is selected to provide an interference fit around the peripheral surfaces of rounded base contact 24 FIG. 4. As is the case with upper blade 34, FIG. 1B, the upper blade 35 terminates in an angled lead-in 47, FIG. ID. Angled lead-in 47 performs the same function in use as lead-in 48, FIG. 1B.

The use of tool l0A, FIG. ID, differs only slightly from the use of tool 10, FIG. 1A. Namely, as the tool 10A is pushed onto lamp 12, lead-in 47 flexes and slides up and over base contact 24 as does lead-in 48 of tool 10. The tool l0A continues to be moved across base contact 24 and stops with the interior peripheral surface of aperture 43 engaged with the peripheral surface of base contact 24; thereby captivating or locking lamp 12 between upper and lower blades 35 and 32 respectively previously described.

The installation of lamp 12 with tool l0A also differs slightly from that with the use of tool 10. Namely, in order to withdraw tool l0A after installing lamp 12 into lamp housing 14 it may be necessary to lift upper blade 34 slightly in order to clear the peripheral surface of 30 aperture 43 from base contact 24.

As will now be understood, the present invention has many advantages in use. Accordingly, an advantage of this invention is in providing a tool for securely replacing lamps. Another advantage of this invention is in providing a lamp replacement tool that minimizes the likelihood of dropping lamps during the replacement process. A further advantage of this invention is in providing an improved lamp replacement tool which is simple and easy to use and which positively captivates the lamp for removal or insertion into the lamp housing.

While the present invention has been described in a particular embodiment it is to be understood that the words which have been used to describe the invention are words of description rather than of limitation and that changes may be made to the above described invention without departing from the true spirit of the invention in its broader aspects within the scope of the appended claims.

The embodiments of an invention in which an exclusive property of right is claimed are defined as follows:

1. A lamp replacement tool for use in replacing a lamp mounted in a lamp housing wherein the lamp includes a bulb portion, a base portion having one end adjacent the bulb portion, a base contact protruding from another end of the base portion and a flange positioned on the base portion intermediate of the base portion ends, said tool comprising:

a. a handle member, b. a lower blade extending from said handle member, c. flange engaging means formed on said lower blade for engaging with the base portion and the flange, d. an upper blade extending from said handle member in the same direction as said lower blade, and e. base contact engaging means formed on said upper blade in predetermined relationship to said flange engaging means.

2. The tool of claim 1 wherein said upper blade extends from said handle member in a spaced apart and parallel relationship to said lower blade.

3. The tool of claim 2 wherein said flange engaging means includes a forked portion.

4. The tool of claim 3 wherein said forked portion is u-shaped and includes chamfered ends.

5. The tool of claim 4 wherein said base contact engaging means includes a v-shape portion.

6. The tool of claim 5 wherein said v-shaped portion includes interior surfaces facing said lower blade and an apex formed transverse to the width of said upper blade.

7. The tool of claim 6 wherein said apex is aligned with the center-of-radius of said u-shaped portion.

8. The tool of claim 5 wherein said upper blade terminates at an angled lead-in extending from said v-shaped portion.

9. The tool of claim 4 wherein said upper blade includes an aperture formed therethrough.

10. The tool of claim 91 wherein said aperture is aligned with the center-of-radius of said u-shaped portion.

11. The tool of claim 1 wherein said handle member includes a pry-blade extending therefrom.

12. The tool of claim 11 wherein said pry-blade includes a wedge-shaped distal end.

13. A lamp replacement tool for use in replacing a lamp mounted in a lamp housing wherein the lamp includes a bulb portion, a base portion having one end adjacent the bulb portion, a base contact protruding from another end of the base portion and a flange positioned on the base portion intermediate of the base portion ends, said tool comprising:

a. a handle member,
b. a lower blade extending from said handle member,
c. an upper blade extending from said handle member in the same direction as said lower blade in a spaced apart parallel relationship to said lower blade with said lower blade terminating in a u-shaped forked portion having chamfered ends,
d. said upper blade including a v-shaped portion having interior surfaces thereof facing said lower blade and an apex formed transverse to the width of said upper blade, and
e. said upper blade terminating in a lead-in extending from said v-shaped portion.

14. The tool of claim 13 wherein said handle member includes a pry-blade extending therefrom in a direction opposite to said upper and lower blades.

15. The tool of claim 13 wherein said apex is aligned with the center-of-radius of said u-shaped fork portion.

16. A lamp replacement tool for use in replacing a lamp mounted in a lamp housing wherein the lamp includes a bulb portion, a base portion having one end adjacent the bulb portion, a base contact protruding from another end of the base portion and a flange positioned on the base portion intermediate of the base portion ends, said tool comprising:

a. a handle member,
b. a lower blade extending from said handle member,
c. an upper blade extending from said handle member in the same direction as said lower blade in a spaced apart parallel relationship to said lower blade with said lower blade terminating in a u-shaped forked portion having chamfered ends,
d. said upper blade including an aperture formed therethrough and aligned with the center-of-radius of said u-shaped fork portion, and
e. said upper blade terminating in a lead-in extending from said aperture.

17. The tool of claim 16 wherein said handle member includes a pry-blade extending therefrom in a direction opposite to said upper and lower blades.

* * * * *